US011379209B2

(12) United States Patent
Liu et al.

(10) Patent No.: US 11,379,209 B2
(45) Date of Patent: Jul. 5, 2022

(54) UPGRADE OF A SOFTWARE PRODUCT

(71) Applicant: EMC IP Holding Company LLC, Hopkinton, MA (US)

(72) Inventors: Min Liu, Shanghai (CN); Weiyang Liu, Shanghai (CN); Ming Zhang, Shanghai (CN); Yubing Zhang, Shanghai (CN); Naveen Rastogi, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/419,210

(22) Filed: May 22, 2019

(65) Prior Publication Data
US 2020/0371771 A1 Nov. 26, 2020

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45583* (2013.01)

(58) Field of Classification Search
CPC .................... G06F 9/45558; G06F 2009/45583
See application file for complete search history.

(56) References Cited

U.S. PATENT DOCUMENTS

| | | | | |
|---|---|---|---|---|
| 6,202,207 B1* | 3/2001 | Donohue | .................. | G06F 8/65 705/59 |
| 8,713,556 B2* | 4/2014 | Bozak | ....................... | G06F 8/65 717/170 |
| 9,965,307 B2* | 5/2018 | Petrov | .................. | G06F 9/45558 |
| 2006/0282479 A1* | 12/2006 | Johnson | ..................... | G06F 8/65 |
| 2007/0294676 A1* | 12/2007 | Mellor | ................ | G06F 9/45533 717/139 |

(Continued)

OTHER PUBLICATIONS

Chen et al., "Virtual Disk Image Reclamation for Software Updates in Virtual Machine Environments", published by IEEE, 2009 IEEE International Conference on Networking, Architecture, and Storage, pp. 43-50 (Year: 2009).*

(Continued)

*Primary Examiner* — S. Sough
*Assistant Examiner* — Zheng Wei
(74) *Attorney, Agent, or Firm* — Womble Bond Dickinson (US) LLP

(57) ABSTRACT

An apparatus for upgrading a software product is provided. The apparatus generates an upgrade package of the software product, the upgrade package including an installation file of the software product, a metadata file and one or more executable files. The apparatus also executes the one or more executable files to perform operations for upgrading the software product. The operations include unpacking the installation file; adding a disk file in the installation file to a virtual machine based on a file name indicated in the metadata file, the disk file including upgraded files of the software product; mounting the disk file to a mount point of the virtual machine, wherein the mount point is indicated in the metadata file; and providing a path to access the upgraded files based on the mount point and a folder path of the upgraded files indicated in the metadata file.

14 Claims, 5 Drawing Sheets

(56) References Cited

U.S. PATENT DOCUMENTS

| | | | |
|---|---|---|---|
| 2011/0265076 A1* | 10/2011 | Thorat | G06F 9/45533 |
| | | | 718/1 |
| 2015/0220324 A1* | 8/2015 | Arcese | G06F 8/65 |
| | | | 717/170 |
| 2018/0181655 A1* | 6/2018 | Mateev | G06F 16/113 |
| 2018/0246710 A1* | 8/2018 | Kim | G06F 8/65 |
| 2019/0026138 A1* | 1/2019 | Cao | G06F 9/45558 |

OTHER PUBLICATIONS

Galan et al., "Autoconfiguration of Enterprise-class Application Deployment in Virtualized Infrastructure Using OVF Activation Mechanisms", published by 6th International DMTF workshop on Systems and Virtualization Management (SVM 2012) / CNSM 2012, pp. 414-421 (Year: 2012).*

Author unknown, "Open Virtualization Format White Paper", published by DMFT, Document Idnetifier:DSP2017, Version 2.0.0, pp. 1-87 (Year: 2014).*

Author unknown, "Developer's Guide to Building vApps and Virtual Appliances—VMware Studio 2.6", published by vmware, pp. 1-158 (Year: 2012).*

* cited by examiner

«UPGRADE OF A SOFTWARE PRODUCT

TECHNOLOGICAL FIELD

The present disclosure relates generally to upgrade of a software product, and in particular, to upgrade of a software product using an upgrade package of the software product.

BACKGROUND

Many integrated software products include some optional components delivered as open virtualization appliance (OVA) files. The OVA files may be stored in the format of .ovf files. For customers who may deploy a latest version of an optional component of an integrated software product, the integrated compliance upgrade package of the integrated software product may include both an upgrade package of the optional component and an OVA file of the optional component. The upgrade package of the optional component may include the upgraded files needed to upgrade the optional component to the latest version. The OVA file of the optional component may be an installation file including all files of the optional component with the latest version. When the integrated software product includes a large number of optional components, each of the optional components may include an upgrade package and an OVA file. Thus, the size of the integrated compliance upgrade package of the integrated software product may be large.

One solution is to provide multiple integrated compliance upgrade packages of the integrated software product to customers. Each of the integrated compliance upgrade packages includes upgrade packages and OVA files for different optional components. In this way, each of the integrated compliance upgrade packages may have a smaller size. However, customers may not know how to correctly choose the needed integrated compliance upgrade package among the multiple integrated compliance upgrade packages to meet their needs.

Therefore, it would be desirable to have a system and method that takes into account at least some of the issues discussed above, as well as other possible issues.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
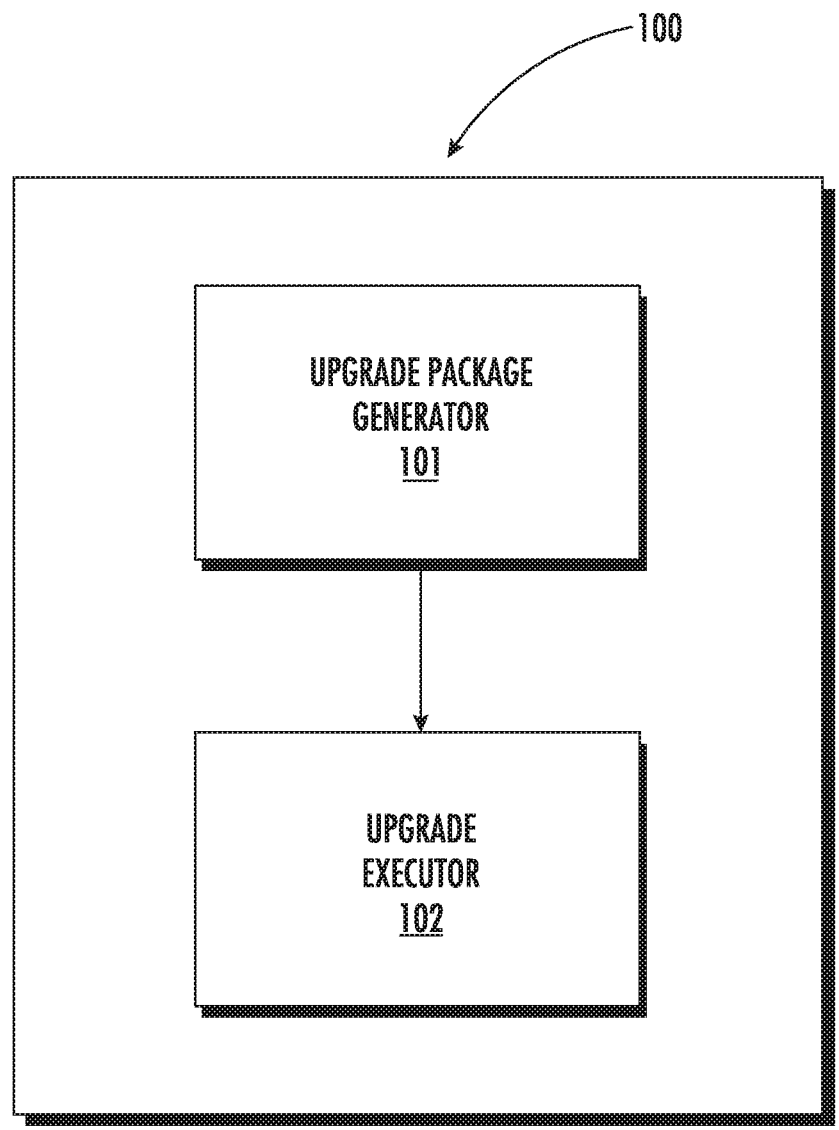
FIG. 1 illustrates a system for upgrading a software product, according to example implementations of the present disclosure.

Example implementations can provide an integrated compliance upgrade package of an integrated software product with a smaller size comparing to conventional solutions. The integrated compliance upgrade package may include upgrade packages of optional components. The upgrade packages may include installation files such as OVA files of the optional components. The OVA files of the optional components may include all files of the optional components with the latest version and thus inherently include all the upgraded files needed to upgrade the optional components to the latest version. In example implementations, the upgrade packages of the optional components do not include the upgraded files outside the OVA files because the OVA files already include the needed upgraded files. In this way, the size of the upgrade packages is close to the size of the OVA files of the optional components. Also, because the OVA files include all the upgraded files needed to upgrade the optional components, a single integrated compliance upgrade package can be provided to customers to upgrade anyone or all of the optional components in the integrated software product.

The present disclosure thus includes, without limitation, the following example implementations.

Some example implementations provide a method of upgrading a software product. The method comprises: generating an upgrade package of the software product, the upgrade package including an installation file of the software product, a metadata file and one or more executable files; and executing the one or more executable files to perform operations for upgrading the software product, including: unpacking the installation file; adding a disk file in the installation file to a virtual machine based on a file name indicated in the metadata file, the disk file including upgraded files of the software product; mounting the disk file to a mount point of the virtual machine, wherein the mount point is indicated in the metadata file; and providing a path to access the upgraded files based on the mount point and a folder path of the upgraded files indicated in the metadata file.

In some example implementations of the method of any preceding example implementation, or any combination of preceding example implementations, the installation file of the software product is an open virtualization appliance (OVA) file.

In some example implementations of the method of any preceding example implementation, or any combination of preceding example implementations, the metadata file indicates a version of the upgraded files.

In some example implementations of the method of any preceding example implementation, or any combination of preceding example implementations, the metadata file indicates a type of a disk file system, and mounting the disk file to the mount point includes mounting the disk file to the mount point based on the type of the disk file system.

In some example implementations of the method of any preceding example implementation, or any combination of preceding example implementations, the upgrade package is included in an integrated software product as an optional component of the integrated software product.

In some example implementations of the method of any preceding example implementation, or any combination of preceding example implementations, the upgrade package does not include the upgraded files outside the installation file.

In some example implementations of the method of any preceding example implementation, or any combination of preceding example implementations, the metadata file is a JavaScript object notation (JSON) file or an extensible markup language (XML) file.

Some example implementations provide an apparatus for upgrading a software product. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for upgrading a software product. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to upgrade of a software product, and in particular, to upgrade of a software product using an upgrade package of the software product.

FIG. 1 illustrates a system 100 for upgrading a software product, according to example implementations of the present disclosure. The software product may be an optional component of an integrated software product. In some implementations, as described in greater detail with reference to FIG. 5, the system may be implemented by an apparatus that includes a processor and a memory storing executable instructions.

As shown, the system 100 includes any of a number of different subsystems (each an individual system) for performing one or more functions or operations. As shown, in some examples, the system includes one or more of each of an upgrade package generator 101 and an upgrade executor 102. The subsystems may be co-located or directly coupled to one another, or in some examples, various ones of the subsystems may communicate with one another across one or more computer networks. Further, although shown as part of the system, it should be understood that any one or more of the upgrade package generator or upgrade executor may function or operate as a separate system without regard to any of the other subsystems. It should also be understood that the system may include one or more additional or alternative subsystems than those shown in FIG. 1. In one implementation, the system 100 is included and implemented in a virtual machine of a server.

In some implementations, the upgrade package generator 101 is configured to generate an upgrade package of a software product. The upgrade package includes an installation file of the software product, a metadata file and one or more executable files. In some implementations, the upgrade package is included in an integrated software product as an optional component of the integrated software product. In some implementations, the installation file of the software product is an open virtualization appliance (OVA) file. The installation file may include all files of the software product with the latest version or a newer version. The one or more executable files may be in the format of shell script files, i.e., .sh files.

The upgrade package generator 101 may provide the generated upgrade package to the upgrade executor 102. In some implementations, the upgrade executor is configured to execute the one or more executable files to perform operations for upgrading the software product. In these implementations, the upgrade executor is configured to unpack the installation file. After the installation file is unpacked, the upgrade executor is configured to add a disk file in the installation file to a virtual machine based on a file name indicated in the metadata file. The disk file includes upgraded files for the software product. The virtual machine may be in a server. As explained above, the installation file may include all files of the software product with the latest version or a newer version and thus inherently include the needed upgraded files to upgrade the software product. In these implementations, the upgrade package does not include the upgraded files outside the installation file.

After the installation file is unpacked, the upgrade executor 102 can find the disk file including the upgraded files based on the file name indicated in the metadata file. The upgraded files may include files of the software product with the latest version or newer version that can be used to upgrade files with an older version.

After the disk file is added to the virtual machine, in some implementations, the upgrade executor 102 is configured to mount the disk file to a mount point of the virtual machine. The mount point is indicated in the metadata file. In some implementations, the metadata file indicates a type of a disk file system, and the upgrade executor is configured to mount the disk file to the mount point based on the type of the disk file system. The type of the disk file system may indicate the type of the disk file.

After the disk file is mounted to the mount point of the virtual machine, in some implementations, the upgrade executor 102 is configured to provide a path to access the upgraded files based on the mount point and a folder path of the upgraded files. The folder path is indicated in the metadata file. Based on the path to access the upgraded files, the upgrade executor can access the upgraded files to upgrade the software product to a latest or newer version.

In some implementations, the metadata file indicates a version of the upgraded files. The upgrade executor 102 can check the version of the upgraded files to determine whether to upgrade the software product. In some implementations, the metadata file is a JavaScript object notation (JSON) file or an extensible markup language (XML) file. In other implementations, the metadata file can have other text formats.

Figure 2:
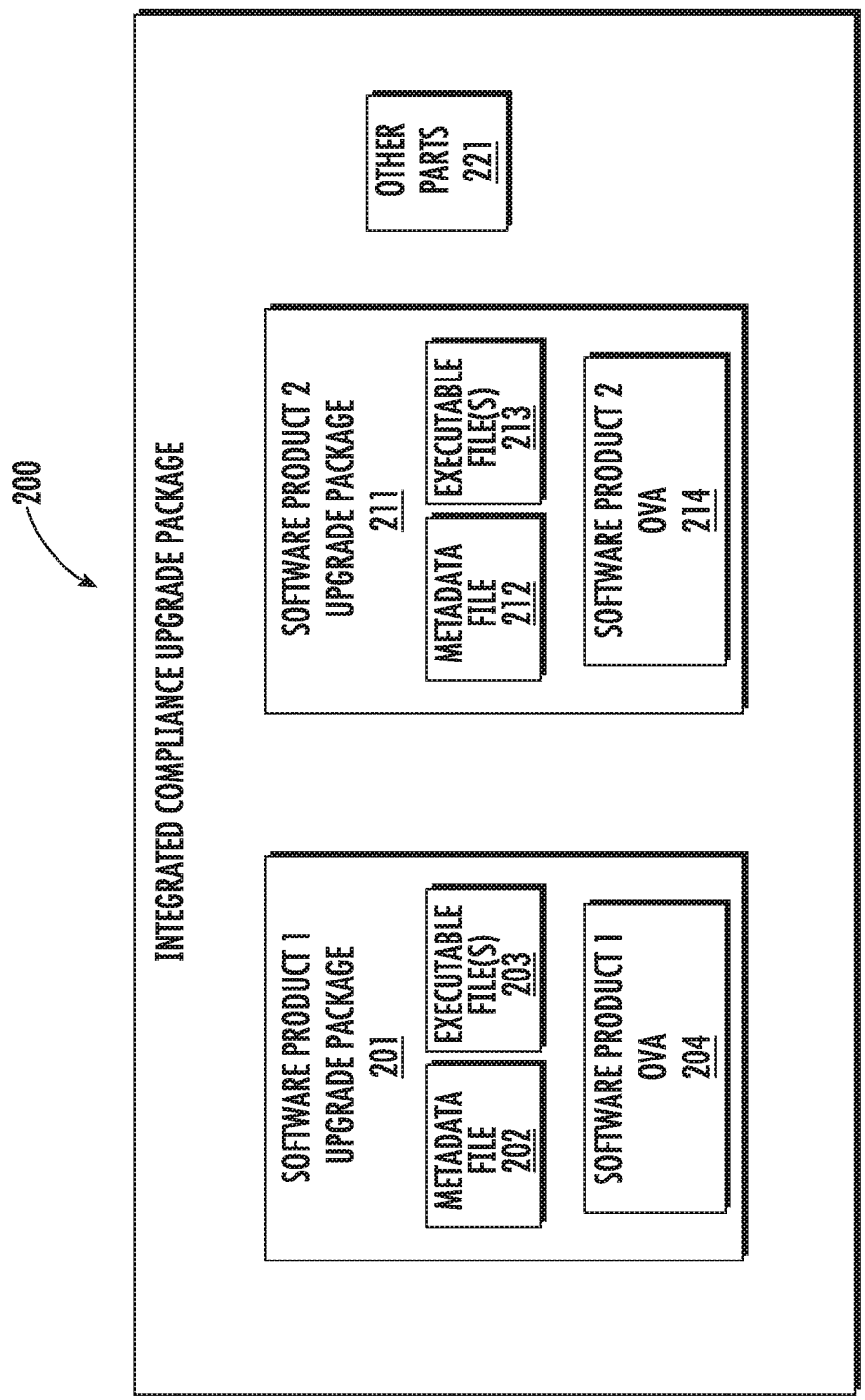
FIG. 2 illustrates an integrated compliance upgrade package, according to example implementations of the present disclosure.

FIG. 2 illustrates an integrated compliance upgrade package 200 of an integrated software product, according to example implementations of the present disclosure. As shown, the integrated compliance upgrade package 200 may include an upgrade package 201 of a software product 1. The upgrade package 201 or the software product 1 may be an optional component of the integrated software product. In one example, the upgrade package 201 may include a metadata file 202, one or more executable files 203 and an installation file 204 of the software product 1. The installation file 204 may be an OVA file of the software product 1 including all files of the software product 1 with the latest version or a newer version. Thus, the installation file 204 may include all the upgraded files needed to upgrade the software product 1 to the latest version or newer version. The upgrade package 201 may not include the needed upgraded files outside the installation file 204. The size of the metadata file 202 and the one or more executable files 203 may be small. Thus, the size of the upgrade package 201 may be close to the installation file 204.

In one implementation, the integrated compliance upgrade package 200 may include upgrade packages for multiple software products or optional components. For example, the integrated compliance upgrade package 200 may also include an upgrade package 211 of a software product 2. The upgrade package 211 or the software product 2 may be also an optional component of the integrated software product. Similarly as the upgrade package 201, the upgrade package 211 may include a metadata file 212, one or more executable files 213 and an installation file 214 of the software product 2. The installation file 214 may be an OVA file of the software product 2 including all files of the software product 2 with the latest version or a newer version. Thus, the installation file 214 may inherently include all the upgraded files needed to upgrade the software product 2 to the latest version or newer version. The upgrade package 211 may not include the needed upgraded files outside the installation file 214. The size of the metadata file 212 and the one or more executable files 213 may be small. Thus, the size of the upgrade package 211 may be close to the installation file 214. Additionally, the integrated compliance upgrade package 200 may also include other parts 221 such as upgrade scripts to invoke upgrade of software product 1 or 2.

In one implementation, the metadata file such as the metadata file 202 may include product information used to access or extract the needed upgraded files from the installation file 204 of the software product 1. One example of the metadata file 202 may be as follows:

```
{
    "targetFile":"xxx-disk1.vmdk",
    "diskType":"ext4",
    "mountPoint":"/tmp/xxx-disk1",
    "rootFolder":"/home/xxx",
    "version":"19.0.0.188"
}
```

In the above example, the metadata file 202 may include information indicating the file name of a disk file (the target file) that includes the needed upgraded files. For example, the file name of the target file may be xxx-disk1.vmdk. The metadata file 202 may also include information indicating a type of a disk file system. The type of the disk file system may indicate the type of the target file. For example, the type of the disk file system may be ext4. The metadata file 202 may also include information indicating a mount point to mount the target file to a mount point of a virtual machine. For example, the mount point may be /tmp/xxx-disk1. The metadata file 202 may further include information indicating a folder path of the upgraded files under the mount point. For example, the folder path (or the root folder) may be /home/xxx. Additionally, the metadata file 202 may include information indicating a version of the upgraded files. For example, the version may be 19.0.0.188.

In one example, the metadata file 212 included in the upgrade package 211 of the software product 2 may include similar information. However, the file name, type of the disk file system, mount point, folder path and version included in the metadata file 212 may be different from those included in the metadata file 202. For each upgrade package of software products or optional components included in the integrated compliance upgrade package 200, the metadata file may include the above product information corresponding to the specific software product or optional component. The metadata file may be a JSON file or an XML file or may have other text formats.

Figure 3:
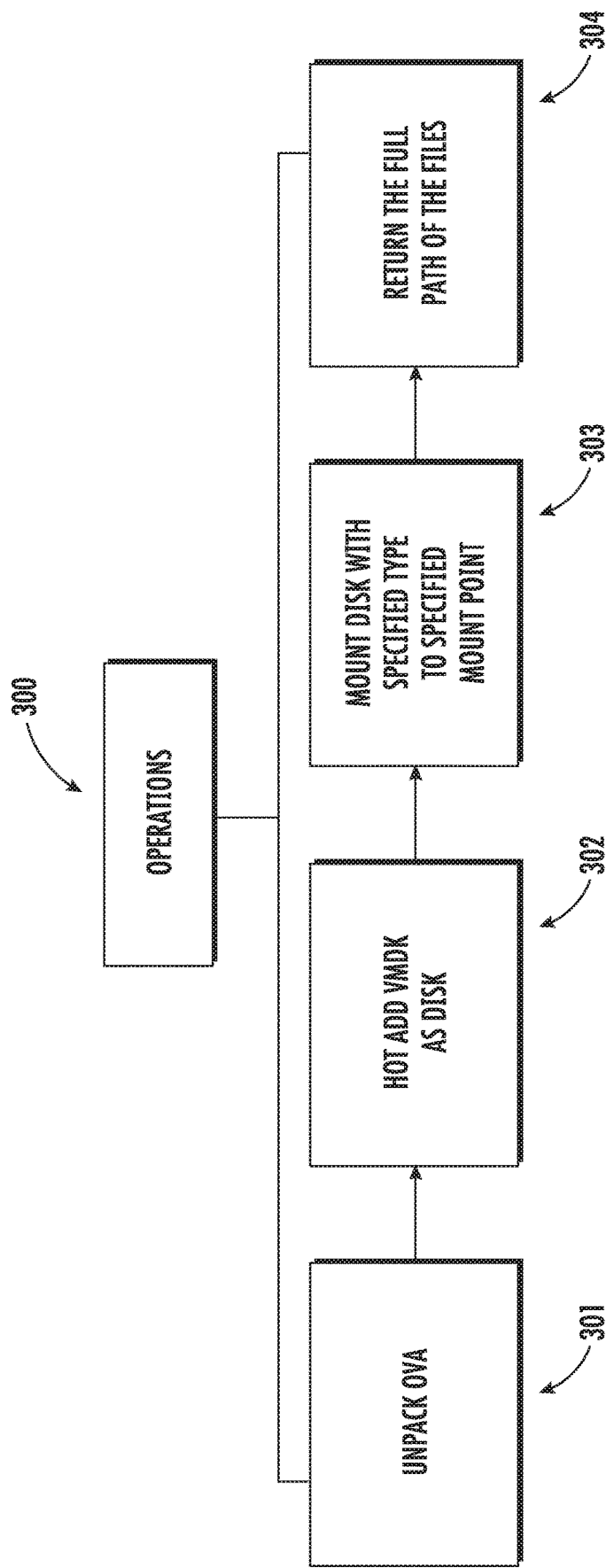
FIG. 3 illustrates a diagram of operations for upgrading a software product, according to example implementations of the present disclosure.

FIG. 3 illustrates a diagram 300 of operations for upgrading a software product, according to example implementations of the present disclosure. In one example that the software product to be upgraded is the software product 1, at block 301, the upgrade executor 102 can unpack the installation file (the OVA file) 204. At block 302, the upgrade executor can use the file name indicated in the metadata file 202 to hot add the disk file xxx-disk1.vmdk to a virtual machine as a disk. At block 303, the upgrade executor can use the type of the disk file system and the mount point indicated in the metadata file 202 to mount the disk file with a specified type to a specified mount point. For example, the upgrade executor can mount the disk file xxx-disk1.vmdk to a mount point tmp/xxx-disk1 of a virtual machine at block 303. At block 304, the upgrade executor can provide or return the full path to access the upgraded files based on the mount point and the folder path of the upgraded files indicated in the metadata file 202. The full path to access the upgraded files may be: mountPoint+"/"+rootFolder. For example, the upgrade executor can access the upgraded files using the path /tmp/xxx-disk1/home/xxx to upgrade the software product to a latest or newer version. Similar operations may be performed to upgrade other software products or optional components included in the integrated compliance upgrade package 200 such as software product 2.

Figure 4:
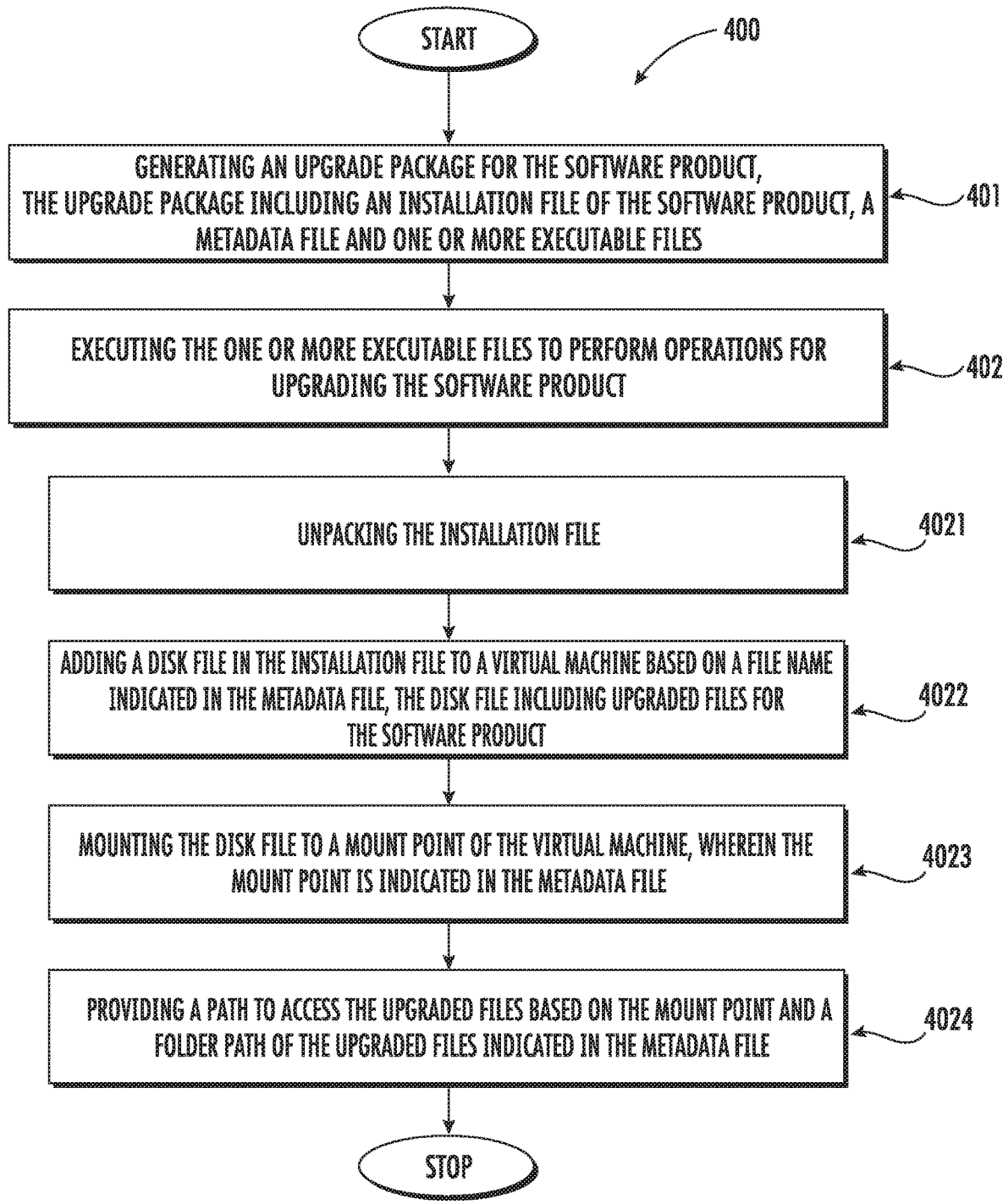
FIG. 4 is a flowchart illustrating various operations in a method of upgrading a software product, according to example implementations of the present disclosure.

FIG. 4 is a flowchart illustrating various operations in a method 400 of upgrading a software product, according to various example implementations. At block 401, the method includes generating an upgrade package of the software product. The upgrade package includes an installation file of the software product, a metadata file and one or more executable files. At block 402, the method includes executing the one or more executable files to perform operations for upgrading the software product. In one example, the operations performed at block 402 can be further divided into four steps as shown in sub-blocks 4021, 4022, 4023 and 4024. At sub-block 4021, the method includes unpacking the installation file. At sub-block 4022, the method includes adding a disk file in the installation file to a virtual machine based on a file name indicated in the metadata file. The disk file includes upgraded files of the software product. At sub-block 4023, the method includes mounting the disk file to a mount point of the virtual machine. The mount point is indicated in the metadata file. At sub-block 4024, the method includes providing a path to access the upgraded files based on the mount point and a folder path of the upgraded files indicated in the metadata file.

According to example implementations of the present disclosure, the system 100 and its subsystems including the upgrade package generator 101 and upgrade executor 102 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 5:
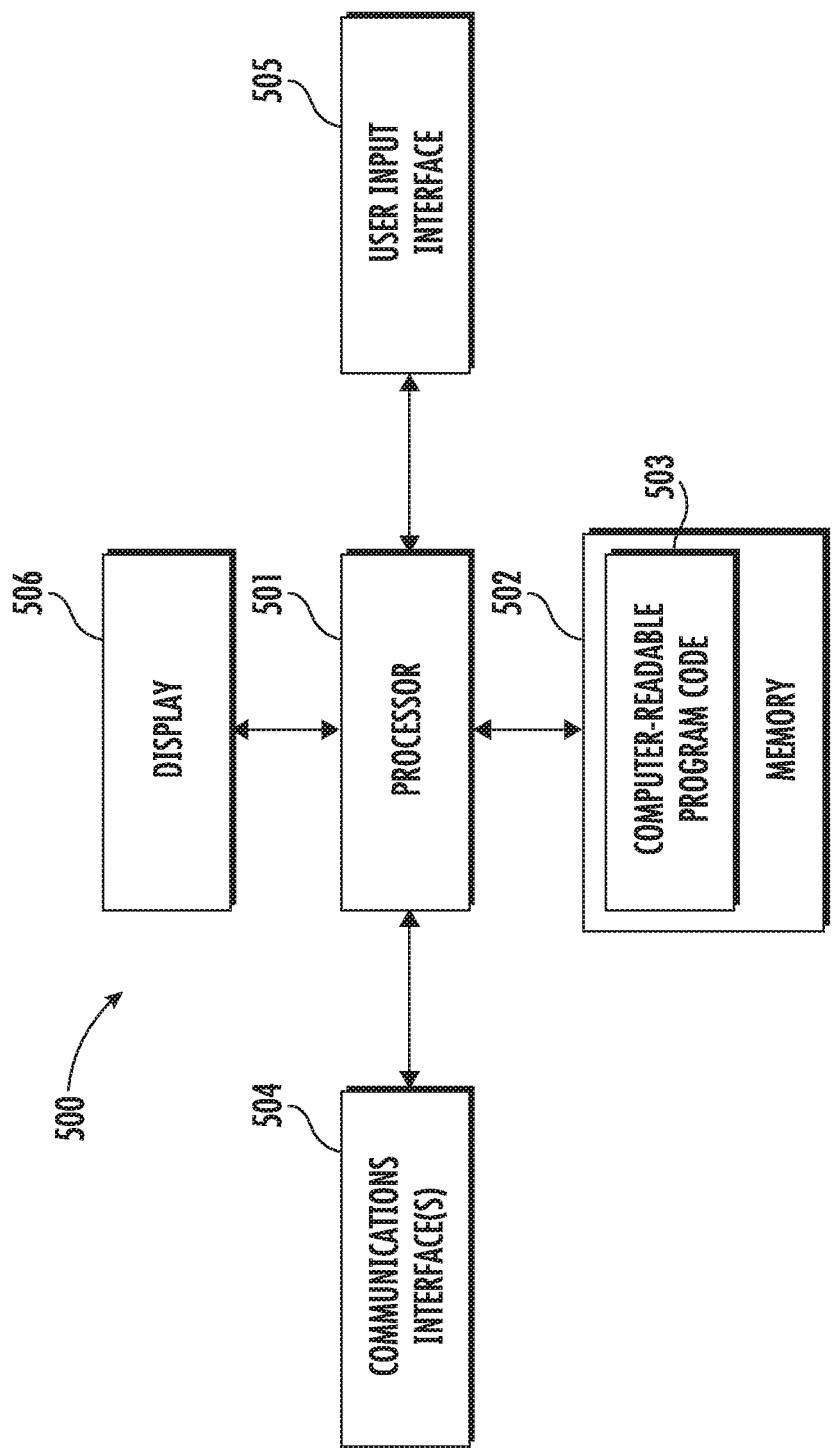
FIG. 5 illustrates an apparatus according to example implementations of the present disclosure.

FIG. 5 illustrates an apparatus 500 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 501 (e.g., processing circuitry) connected to a memory 502 (e.g., storage device). In some examples, the apparatus 500 implements the system 100.

The processor 501 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 502 (of the same or another apparatus).

The processor 501 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 502 is generally any piece of computer hardware that is capable of storing information such as, for example, data, computer programs (e.g., computer-readable program code 503) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 502, the processor 501 may also be connected to one or more interfaces for displaying, transmitting and/or receiving information. The interfaces may include a communications interface 504 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 506 and/or one or more user input interfaces 505 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 501 and a computer-readable storage medium or memory 502 coupled to the processor, where the processor is configured to execute computer-readable program code 503 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of upgrading a software product, comprising:
generating an upgrade package of the software product, the upgrade package including an installation file of the software product, a metadata file and one or more executable files, wherein the metadata file indicates a version of upgraded files of the software product, and a type of a disk file system, the version of the upgraded files being used to determine whether to upgrade the software product, wherein the one or more executable files are in a format of shell script files, and wherein the installation file of the software product has a size close to a size of the upgrade package; and
executing the one or more executable files to perform operations for upgrading any one or all of optional components in the software product, including:
unpacking the installation file, wherein the installation file includes files of the software product with a latest version;
adding a disk file in the installation file to a virtual machine as a disk based on a file name indicated in the metadata file, the disk file including the upgraded files;
mounting the disk file to a mount point of the virtual machine, wherein the mount point is based on the type of the disk file system indicated in the metadata file; and
providing a path to access the upgraded files based on the mount point and a folder path of the upgraded files indicated in the metadata file.

2. The method of claim 1, wherein the installation file of the software product is an open virtualization appliance (OVA) file.

3. The method of claim 1, wherein the upgrade package is included in an integrated software product as an optional component of the integrated software product.

4. The method of claim 1, wherein the upgrade package does not include the upgraded files outside the installation file.

5. The method of claim 1, wherein the metadata file is a JavaScript object notation (JSON) file or an extensible markup language (XML) file.

6. An apparatus for upgrading a software product, the apparatus comprising a processor and a memory storing executable instructions that, in response to execution by the processor, cause the apparatus to:
generate an upgrade package of the software product, the upgrade package including an installation file of the software product, a metadata file and one or more executable files, wherein the metadata file indicates a version of upgraded files of the software product, and a type of a disk file system, the version of the upgraded files being used to determine whether to upgrade the software product, wherein the one or more executable files are in a format of shell script files, and wherein the installation file of the software product has a size close to a size of the upgrade package; and
execute the one or more executable files to perform operations for upgrading any one or all of optional components in the software product, including:
unpack the installation file, wherein the installation file includes files of the software product with a latest version;
add a disk file in the installation file to a virtual machine as a disk based on a file name indicated in the metadata file, the disk file including the upgraded files;
mount the disk file to a mount point of the virtual machine, wherein the mount point is based on the type of the disk file system indicated in the metadata file; and provide a path to access the upgraded files based on the mount point and a folder path of the upgraded files indicated in the metadata file.

7. The apparatus of claim 6, wherein the installation file of the software product is an open virtualization appliance (OVA) file.

8. The apparatus of claim 6, wherein the upgrade package is included in an integrated software product as an optional component of the integrated software product.

9. The apparatus of claim 6, wherein the upgrade package does not include the upgraded files outside the installation file.

10. The apparatus of claim 6, wherein the metadata file is a JavaScript object notation (JSON) file or an extensible markup language (XML) file.

11. A computer-readable storage medium for upgrading a software product, the computer-readable storage medium being non-transitory and having computer-readable program code stored therein that in response to execution by a processor, causes an apparatus to:
   generate an upgrade package of the software product, the upgrade package including an installation file of the software product, a metadata file and one or more executable files, wherein the metadata file indicates a version of upgraded files of the software product, and a type of a disk file system, the version of the upgraded files being used to determine whether to upgrade the software product, wherein the one or more executable files are in a format of shell script files, and wherein the installation file of the software product has a size close to a size of the upgrade package; and
   execute the one or more executable files to perform operations for upgrading any one or all of optional components in the software product, including:
      unpack the installation file, wherein the installation file includes files of the software product with a latest version;
      add a disk file in the installation file to a virtual machine as a disk based on a file name indicated in the metadata file, the disk file including the upgraded files;
      mount the disk file to a mount point of the virtual machine, wherein the mount point is based on the type of the disk file system indicated in the metadata file; and
      provide a path to access the upgraded files based on the mount point and a folder path of the upgraded files indicated in the metadata file.

12. The computer-readable storage medium of claim 11, wherein the installation file of the software product is an open virtualization appliance (OVA) file.

13. The computer-readable storage medium of claim 11, wherein the upgrade package is included in an integrated software product as an optional component of the integrated software product.

14. The computer-readable storage medium of claim 11, wherein the upgrade package does not include the upgraded files outside the installation file.

\* \* \* \* \*